(12) United States Patent
Watarai et al.

(10) Patent No.: US 8,651,254 B2
(45) Date of Patent: Feb. 18, 2014

(54) APPARATUS FOR A DISK BRAKE

(75) Inventors: Etsuyoshi Watarai, Izumi (JP); Shinichi Takizawa, Izumisano (JP); Hisashi Matsui, Minatoku (JP)

(73) Assignee: Shimano, Inc., Sakai (JP)

( * ) Notice: Subject to any disclaimer, the term of this patent is extended or adjusted under 35 U.S.C. 154(b) by 1291 days.

(21) Appl. No.: 10/906,113

(22) Filed: Feb. 3, 2005

(65) Prior Publication Data

US 2005/0173215 A1 Aug. 11, 2005

(30) Foreign Application Priority Data

Feb. 5, 2004 (JP) .................................. 2004-029767
Nov. 1, 2004 (JP) .................................. 2004-318125

(51) Int. Cl.
*F16D 65/16* (2006.01)

(52) U.S. Cl.
USPC ............................. 188/370; 188/26; 188/72.4

(58) Field of Classification Search
USPC ................ 188/72.4, 370, 26, 24.22
See application file for complete search history.

(56) References Cited

U.S. PATENT DOCUMENTS

| 6,244,393 B1 | 6/2001 | Weidenweber et al. | |
|---|---|---|---|
| 6,347,689 B1 * | 2/2002 | Ohishi | 188/72.4 |
| 2003/0107185 A1 | 6/2003 | Matsuki | |

FOREIGN PATENT DOCUMENTS

| DE | 2218376 | 11/1972 |
|---|---|---|
| EP | 762006 A1 | 3/1997 |
| EP | 1167807 A2 | 1/2002 |
| GB | 1512778 | 6/1978 |
| GB | 2129878 A | 5/1984 |
| JP | 09-072361 A | 3/1997 |
| JP | 10-325432 A | 12/1998 |

OTHER PUBLICATIONS

Patent Abstracts of Japan, vol. 018, No. 269 (M-1609), published May 23, 1994, for JP 06-042562, published Feb. 15, 1994.
Patent Abstracts of Japan, vol. 018, No. 644 (M-1718), published Dec. 7, 1994, for JP 06-249275, published Sep. 6, 1994.
Patent Abstracts of Japan, vol. 1996, No. 02, published Feb. 29, 1996, for JP 07-253128, published Oct. 3, 1995.
Patent Abstracts of Japan, vol. 1996, No. 03, published Mar. 29, 1996, for JP 07-301264, published Nov. 14, 1995.
Patent Abstracts of Japan, vol. 2000, No. 01, published Jan. 31, 2000, for JP 11-280805, published Oct. 15, 1999.

* cited by examiner

*Primary Examiner* — Bradley King
(74) *Attorney, Agent, or Firm* — James A. Deland (57) ABSTRACT

An apparatus for a disk brake comprises a caliper body having an inner peripheral surface and a seal groove disposed at the inner peripheral surface. The inner peripheral surface is dimensioned to slidably receive a piston therein, wherein the piston moves in a direction of a braking direction axis, and the seal groove is dimensioned to receive a seal therein so that the seal can seal a space between the inner peripheral surface and the piston. The seal groove comprises a movement restricting part that restricts movement of the seal in the direction of the braking direction axis, and a movement permitting part formed as a step facing radially inwardly.

12 Claims, 6 Drawing Sheets

APPARATUS FOR A DISK BRAKE

BACKGROUND OF THE INVENTION

The present invention is directed to braking devices and, more particularly, to an apparatus for a disk brake.

Disk brake devices for braking vehicles, such as bicycles, operate by applying friction to a disk brake rotor that is non-rotatably mounted to a wheel. A well-known example of such a disk brake device is a piston retraction type brake device disclosed in Japanese Unexamined Patent Application 10-325432. In that device, a caliper has inner peripheral surfaces that form a pair of opposed cylindrical openings, a piston slidably mounted in each cylindrical opening, and an elastic piston ring seal that seals off the clearance space between the piston and the inner peripheral surface of the cylindrical opening. More specifically, each piston ring is mounted in an annular seal groove formed in the inner peripheral surface its associated cylinder. A movement restricting part is formed in the seal groove for restricting movement of an outer peripheral portion of the piston ring in the braking direction, and a movement permitting part is formed in the seal groove for permitting movement of an inner peripheral portion of the piston ring in the braking direction. The movement permitting part typically has the form of a surface that extends radially inwardly from the movement restricting part and inclines in the braking direction.

When the disk brake is activated, the piston moves in the braking direction to press a brake pad toward the disk brake rotor. The piston ring tends to move with the piston as a result of the frictional contact between the inner peripheral surface of the piston ring and the outer peripheral surface of the piston. However, such movement is generally blocked by the movement restricting part of the seal groove. On the other hand, an inner peripheral portion of the piston ring continues to move with the piston and bends toward the surface of the movement permitting part. The elastic resilience of the piston ring, and particularly the energy stored in the inner peripheral portion of the piston ring that bends toward the surface of the movement permitting part, is used to pull the piston away from the disk rotor when the brake is released.

Since the movement permitting part typically has the form of a surface that is inclined relative to the movement restricting part, the point of contact between the piston ring and the seal groove that functions as a fulcrum for the bending portion of the piston ring tends to move radially inwardly as the inner peripheral portion of the piston ring bends in the braking direction. This, in turn, causes the elastic modulus (spring constant) of the piston ring to increase, thus resulting in greater piston ring displacement relative to the applied load and a corresponding deterioration in brake feel due to variation in shoe clearance and brake release timing.

SUMMARY OF THE INVENTION

The present invention is directed to various features of an apparatus for a disk brake. In one embodiment, an apparatus for a disk brake comprises a caliper body having an inner peripheral surface and a seal groove disposed at the inner peripheral surface. The inner peripheral surface is dimensioned to slidably receive a piston therein, wherein the piston moves in a direction of a braking direction axis, and the seal groove is dimensioned to receive a seal therein so that the seal can seal a space between the inner peripheral surface and the piston. The seal groove comprises a movement restricting part that restricts movement of the seal in the direction of the braking direction axis, and a movement permitting part formed as a step facing radially inwardly. Additional inventive features will become apparent from the description below, and such features alone or in combination with the above features may form the basis of further inventions as recited in the claims and their equivalents.

BRIEF DESCRIPTION OF THE DRAWINGS

FIGS. 5A-4E illustrate deformation of a piston ring disposed in a conventional seal groove upon movement of its corresponding piston in a braking direction.

DETAILED DESCRIPTION OF THE EMBODIMENTS

Figure 1:
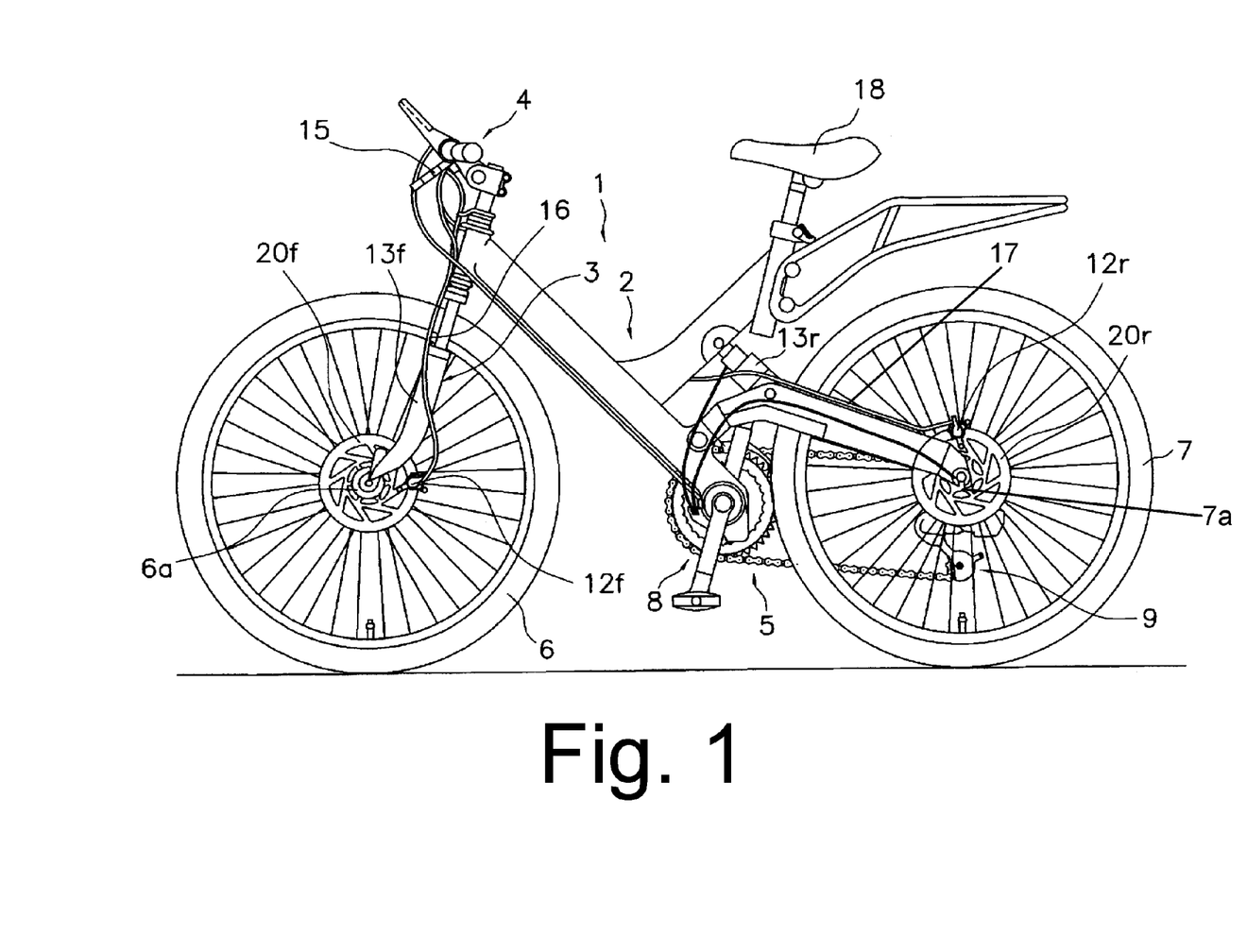
FIG. 1 is a side view of a particular embodiment of a bicycle.

FIG. 1 is a side view of a particular embodiment of a bicycle 1. Bicycle 1 is a mountain bicycle comprising a frame 2 with a rear suspension 13r, a front fork 3 including a front suspension 13f mounted to the front of frame 2 for rotation around an inclined axis, a handlebar assembly 4 mounted to the upper part of fork 3, a front wheel 6 rotatably attached to the lower part of fork 3, a rear wheel 7 rotatably attached to the rear of frame 2, a drive mechanism 5 including a front transmission 8 and a rear transmission 9, and a saddle 18 mounted to an upper middle portion of frame 2.

A front wheel disk brake caliper assembly 12f operates in conjunction with a front disk brake rotor 20f attached to a hub 6a of front wheel 6 for braking front wheel 6, and a rear wheel disk brake caliper assembly 12r operates in conjunction with a rear disk brake rotor 20r attached to a hub 7a of rear wheel 7 for braking rear wheel 7. Brake lever assemblies 15 are provided on both ends of handlebar assembly 4 (only one brake lever assembly 15 is shown in FIG. 1). One brake lever assembly 15 is connected to front wheel disk brake caliper assembly 12f through tubing 16 for supplying hydraulic brake fluid to front wheel disk brake caliper assembly 12f, and the other brake lever assembly 15 is connected to rear wheel disk brake caliper assembly 12r through tubing 17 for supplying hydraulic brake fluid to rear wheel disk brake caliper assembly 12r. Front and rear wheel disk brake caliper assemblies 12f and 12r have generally the same structure, so only front wheel disk brake caliper assembly 12f will be described in detail.

Figure 2:
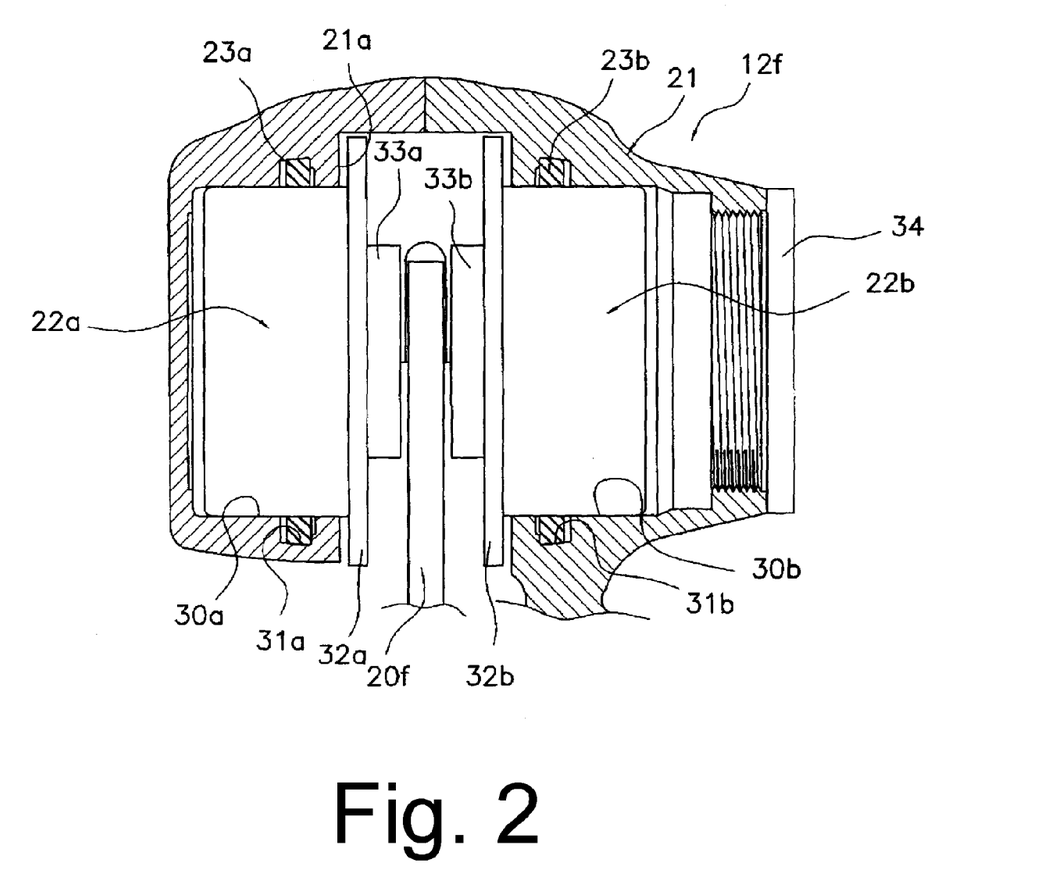
FIG. 2 is a partial cross sectional view of a particular embodiment of a disk brake device.

As shown in FIG. 2, front disk brake caliper assembly 12f comprises a caliper 21, a pair of pistons 22a and 22b slidably mounted in cylindrical openings 30a and 30b formed by inner peripheral surfaces of caliper 21, and a pair of piston rings 23a and 23b mounted in corresponding seal grooves 31a and 31b formed by the inner peripheral surfaces defining openings 30a and 30b. In this embodiment, caliper 21 has a two-part structure that defines an opening 21a dimensioned to receive the outer circumference of front disk brake rotor 20f therein. Opening 30a is closed off by the body of caliper 21, whereas opening 30b is closed off by a cap 34 that is screwed into caliper 21. Oil passages (not shown) are formed in caliper 21 to communicate hydraulic brake fluid from brake tubing 16 into openings 30a and 30b in response to the operation of the associated brake lever assembly 15.

Pistons 22a and 22b are cylindrically shaped members with corresponding flanges 32a and 32b facing front disk brake rotor 20f. Brake pads 33a and 33b are mounted on flanges 32a and 32b, respectively, for contacting front disk brake rotor 20f. Piston rings 23a and 23b are mounted in seal grooves 31a and 31b so as to contact the outer peripheral surfaces of pistons 22a and 22b, respectively. As a result, piston rings 23a and 23b function as seals, to thereby seal off the clearance space between pistons 22a and 22b and the inner peripheral surfaces defining openings 30a and 30b. Such contact with pistons 22a and 22b also return pistons 22a and 22b to the brake release position by means of elastic resilience. Piston rings 23a and 23b comprise annular members with a generally rectangular cross section and may be formed from nitrile rubber (NBR), including hydrogenated nitrile rubber (HNBR), for example.

Figure 3:
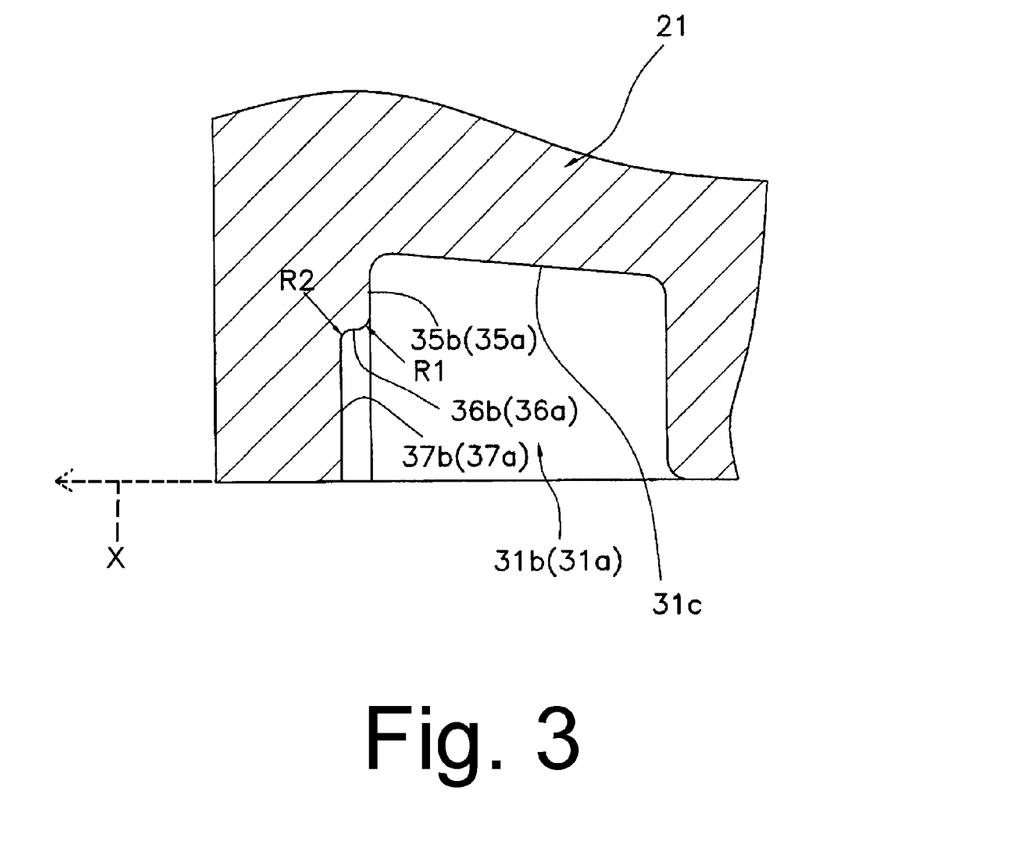
FIG. 3 is a detailed cross sectional view of a particular embodiment of a seal groove.

FIG. 3 is a detailed cross sectional view of seal groove 31b. Seal groove 31a is constructed the same way, albeit in a mirror image. Accordingly, the corresponding reference numbers for seal groove 31a are shown as well, but a separate description is omitted. As shown in FIG. 3, seal grooves 31a and 31b comprise an inner peripheral surface 31c, a movement restricting part formed by a surface 35b extending radially inwardly from inner peripheral surface 31c, and a movement permitting part formed by a stepped surface 36b and a surface 37b extending radially inwardly from stepped surface 36b. Surface 35b forming the movement restricting part restricts axial movement of a radially outer portion of piston ring 23b in a direction of a braking direction axis X when piston 22b moves toward front disk brake rotor 20f. On the other hand, surfaces 36b and 37b forming the movement-permitting part permit axial movement of a radially inner portion of piston ring 23b toward front disk brake rotor 20f with piston 22b. Inner peripheral surface 31c of seal groove 31b is a tapered surface that expands radially outwardly in the direction of braking direction axis X toward front disk brake rotor 20f. Forming inner peripheral surface 31c in this manner allows the inner peripheral surface of piston ring 23b at the portion of piston ring 23b facing away from front disk brake rotor 20f to contact the outer peripheral surface of piston 22b more firmly than the inner peripheral surface of piston ring 23b at the portion of piston ring 23b facing front disk brake rotor 20f, especially when piston ring 23b has a rectangular cross section. Such differential contact forces promote the deformation of the radially inner portion of piston ring 23b toward surface 37b when piston 22b moves toward front disk brake rotor 20f.

In general, surface 35b extends radially inwardly from inner peripheral surface 31c substantially perpendicular to braking direction axis X, surface 36b extends from surface 35b substantially parallel to and facing braking direction axis X, and surface 37b extends radially inwardly from surface 36b substantially perpendicular to braking direction axis X. Thus, surface 36b has an overall cylindrical shape, is parallel to piston 22b and braking direction axis X, and is substantially perpendicular to both surfaces 35b and 37b. A junction between surfaces 35b and 36b forms a rounded corner having a radius of curvature R1 in a range from approximately 0.1 mm to approximately 0.5 mm, and a junction between surfaces 36b and 37b forms a rounded corner having a radius of curvature R2 in a range from approximately 0.1 mm to approximately 0.5 mm.

Figure 4A:
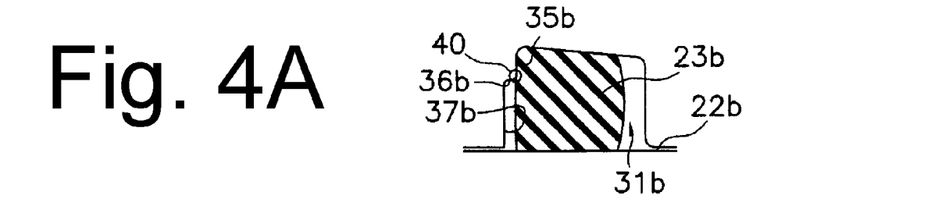
FIGS. 4A-4E illustrate deformation of a piston ring disposed in the seal groove shown in FIG. 3 upon movement of its corresponding piston in a braking direction.
Figure 4B:
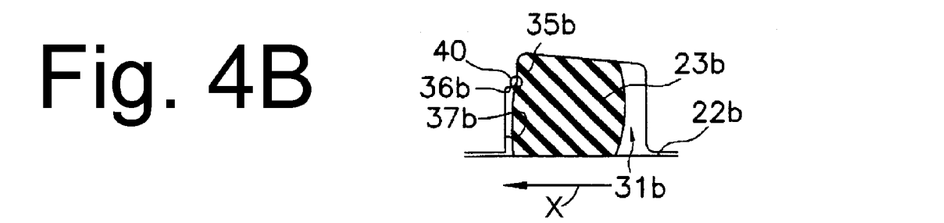
Figure 4C:
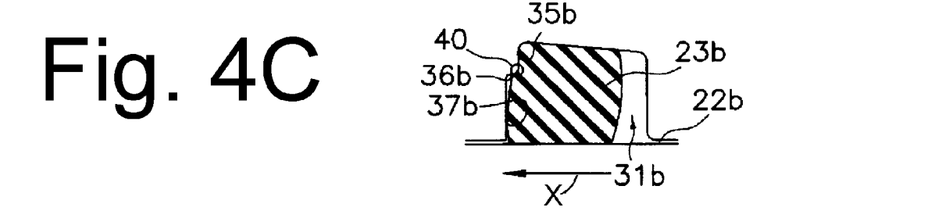
Figure 4D:
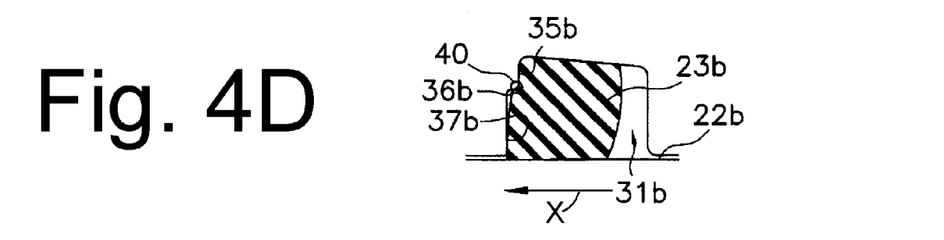
Figure 4E:
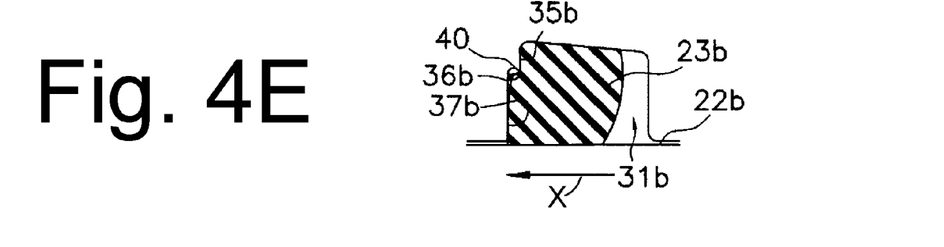
Figure 5A:
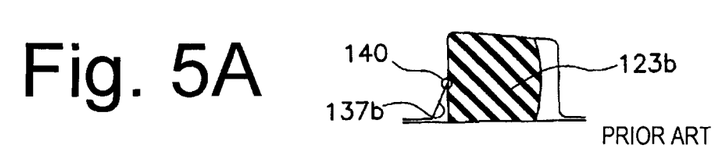
Figure 5B:
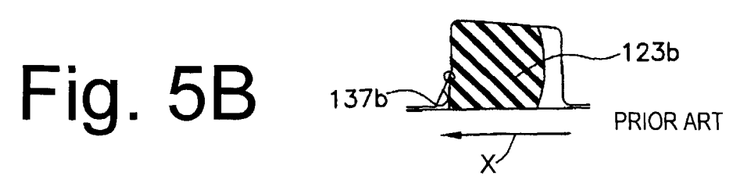
Figure 5C:
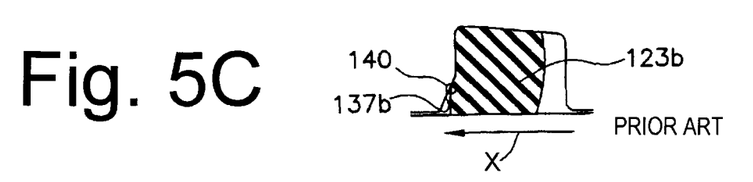
Figure 5D:
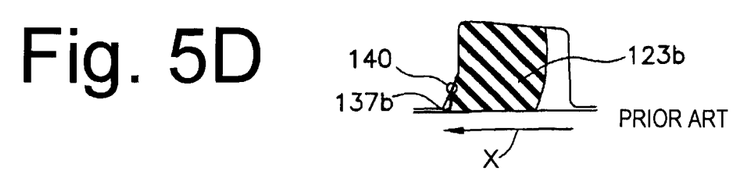
Figure 5E:
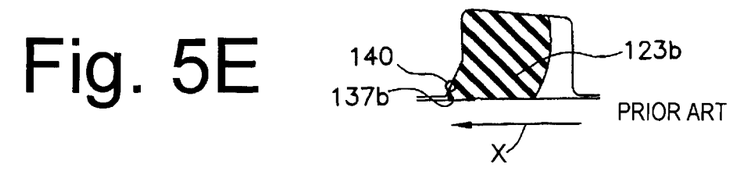

When brake lever assembly 15 is operated to supply hydraulic fluid to openings 30a and 30b, pistons 22a and 22b move toward front disk brake rotor 20f, and brake pads 33a and 33b press against and apply frictional force to front disk brake rotor 20f, thereby braking front wheel 6. At that time, as shown by a conducted simulation in FIGS. 4A-4E, the movement of the radially outer portions of piston rings 23a and 23b toward front disk brake rotor 20f is restricted by surfaces 35a and 35b, but the radially inner portions of piston rings 23a and 23b continue moving toward front disk brake rotor 20f as a result of the frictional contact between piston rings 23a and 23b and their corresponding pistons 22a and 22b. This, in turn, causes a bend in piston rings 23a and 23b at the junction of surfaces 35a, 35b and surfaces 36a, 36b. This movement continues until piston ring 23b contacts surface 37b and forms a space at a junction between surfaces 36b and 37b. Because of the construction of stepped surfaces 36a and 36b, a fulcrum position 40 for the bending portion of each piston ring 23a and 23b is always near the corners formed at the junctions of surfaces 35a, 35b and 36a, 36b. This maintains a low spring constant for piston rings 23a and 23b. When the hydraulic pressure is released, the elastic resilience of piston rings 23a and 23b pull pistons 22a and 22b away from front disk brake rotor 20f, and piston rings return to the state shown in FIG. 4A.

FIGS. 5A-5E show the corresponding movement of a piston ring 123b in a conducted simulation of a conventional caliper structure. As shown in those Figures, a fulcrum position 140 for the bending portion of piston ring 123b moves radially inwardly along a movement permitting surface 136b during operation of the caliper assembly.

Figure 6:
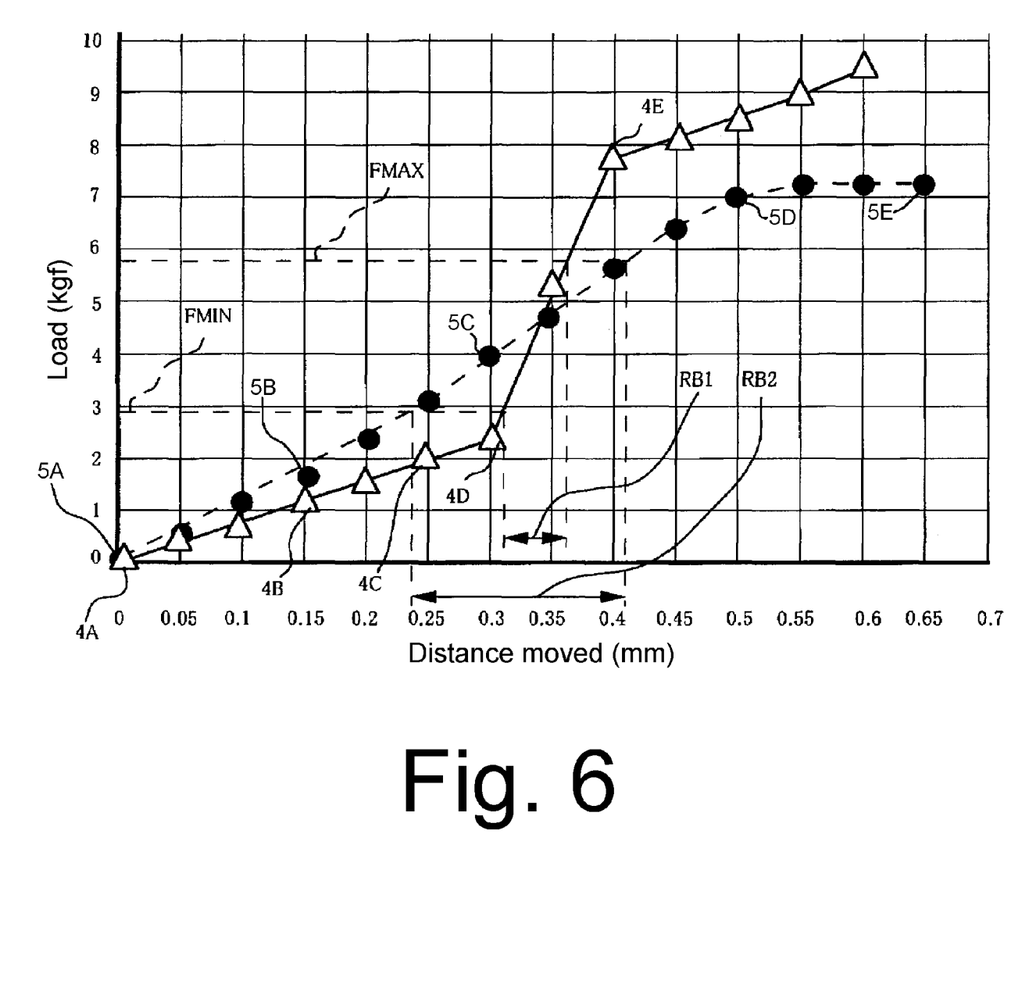
FIG. 6 is a graph of piston ring displacement relative to load corresponding to the examples shown in FIGS. 4A-4E and 5A-5E.

FIG. 6 is a graph showing load (friction force between piston and piston ring) as a function of displacement (extent of piston movement) for the simulations shown in FIGS. 4A-4E and 5A-5E. In the simulations, 1 to 10 kgf load was placed on the pistons, resulting in the piston deformation illustrated in FIGS. 4A through 4E and FIGS. 5A through 5E. In FIG. 6, the white triangles indicate the relationship between displacement and load for the piston ring 23b mounted in the seal grove 31b for each situation depicted in FIGS. 4A-4E, and the black circles indicate the relationship between displacement and load for the piston ring 123b mounted in a conventional seal groove for each situation depicted in FIGS. 5A-5E. In FIG. 6, FMAX indicates the maximum friction between the piston ring and the piston under all conditions, while FMIN indicates the minimum friction between the piston ring and the piston under all conditions. The lower the displacement between FMAX and FMIN, the lower the piston movement away from front disk brake rotor 20f (roll back), and hence shoe clearance, when the brakes are released. This also results in a better braking feel.

As shown in FIG. 6, piston ring 23b contacted surface 37b of movement-permitting component 37b around 0.35 mm. As a result, there was an inflection point of displacement, and the variation in displacement relative to load (friction) was lower. More specifically, the displacement RB1 between FMAX and FMIN was approximately 0.05 mm. On the other hand, since the fulcrum position 140 for the conventional piston ring 123b moves radially inwardly as shown in FIGS. 5A-5E as the load is increased, the spring constant of piston ring 123b correspondingly increases. This results in displacement RB2 of 0.18 mm between FMAX and FMIN. The variation in piston displacement when the brake was released was about 60 to 70% lower in the present embodiment compared to a conventional caliper assembly.

While the above is a description of various embodiments of inventive features, further modifications may be employed without departing from the spirit and scope of the present invention. For example, surfaces 36a, 36b and 37a, 37b of the movement permitting parts were flat, and surfaces 37a, 37b were parallel to surfaces 35a and 35b of the movement restricting parts, but the various surfaces need not be flat as long as they form a radially inward step. For example, the various surfaces may be tapered or curved surfaces. Similarly, while surfaces 36a and 36b formed the shape of a cylinder parallel to pistons 22a and 22b, surfaces 36a and 36b also may be tapered, with or without rounded corners in any event.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for a disk brake comprising:
a piston;
a seal;
a caliper body having an inner peripheral surface defining an opening dimensioned to slidably receive the piston therein, wherein the piston moves in a direction of a braking direction axis in response to hydraulic fluid applied to the opening;
a seal groove disposed at the inner peripheral surface of the opening and dimensioned to receive the seal therein so that the seal can seal a space between the inner peripheral surface and the piston, wherein the seal groove comprises:
a seal groove inner peripheral surface;
a movement restricting surface that extends radially inwardly from the seal groove inner peripheral surface and that restricts axial movement of a radially outer portion of the seal in the direction of the braking direction axis; and
a movement permitting part that permits axial movement of a radially inner portion of the seal upon movement of the piston in the direction of the braking direction axis, wherein the movement permitting part comprises:
a stepped surface formed radially inwardly from the seal groove inner peripheral surface; and
a side surface that extends radially inwardly from the stepped surface;
wherein a corner is formed between the movement restricting surface and the stepped surface of the movement permitting part to form a fulcrum for bending the radially inner portion of the seal;
wherein the stepped surface is oriented relative to the corner such that a fulcrum position of the seal for a bending portion of the seal is always near the corner so that the seal does not progressively contact the stepped surface adjacent to the corner as the radially inner portion of the seal moves toward the side surface; and
wherein the first corner has a radius of curvature in a range of from approximately 0.1 millimeter to approximately 0.5 millimeter.

2. The apparatus according to claim 1 wherein the seal comprises nitrile rubber.

3. The apparatus according to claim 2 wherein the seal comprises hydrogenated nitrile rubber.

4. The apparatus according to claim 1 wherein a junction between the stepped surface of the movement permitting part and the movement restricting surface is shaped such that, upon movement of the piston in the direction of the braking direction axis by a selected amount, the seal contacts the side surface of the movement permitting part and forms a space at a junction between the stepped surface and the side surface of the movement permitting part.

5. The apparatus according to claim 1 wherein the radially inner portion of the seal contacts the side surface of the movement permitting part upon movement of the radially inner portion of the seal in the direction of the braking direction axis by a selected amount.

6. The apparatus according to claim 5 wherein the stepped surface has a generally cylindrical shape parallel to the braking direction axis, substantially perpendicular to the movement restricting surface, and substantially perpendicular to the side surface.

7. The apparatus according to claim 1 wherein the movement restricting surface originates from the seal groove inner peripheral surface.

8. The apparatus according to claim 1 wherein only one corner is formed between the movement restricting surface and the stepped surface of the movement permitting part to form the fulcrum for bending the radially inner portion of the seal.

9. The apparatus according to claim 8 wherein the corner forms the only fulcrum between the seal groove inner peripheral surface and the side surface.

10. An apparatus for a disk brake comprising:
a piston;
a seal;
a caliper body having an inner peripheral surface defining an opening dimensioned to slidably receive the piston therein, wherein the piston moves in a direction of a braking direction axis in response to hydraulic fluid applied to the opening;
a seal groove disposed at the inner peripheral surface of the opening and dimensioned to receive the seal therein so that the seal can seal a space between the inner peripheral surface and the piston, wherein the seal groove comprises:
a seal groove inner peripheral surface;
a movement restricting surface that extends radially inwardly from the seal groove inner peripheral surface and that restricts axial movement of a radially outer portion of the seal in the direction of the braking direction axis; and
a movement permitting part that permits axial movement of a radially inner portion of the seal upon movement of the piston in the direction of the braking direction axis, wherein the movement permitting part comprises:
a stepped surface formed radially inwardly from the seal groove inner peripheral surface; and
a side surface that extends radially inwardly from the stepped surface;
wherein a corner is formed between the movement restricting surface and the stepped surface of the movement permitting part to form a fulcrum for bending the radially inner portion of the seal;
wherein the stepped surface is oriented relative to the corner such that a fulcrum position of the seal for a bending portion of the seal is always near the corner so that the seal does not progressively contact the stepped surface adjacent to the corner as the radially inner portion of the seal moves toward the side surface;

wherein the stepped surface has a generally cylindrical shape parallel to the braking direction axis, substantially perpendicular to the movement restricting surface, and substantially perpendicular to the side surface; and wherein the corner has a radius of curvature in a range of from approximately 0.1 millimeter to approximately 0.5 millimeter.

11. The apparatus according to claim 10 wherein only one corner is formed between the movement restricting surface and the stepped surface of the movement permitting part to form the fulcrum for bending the radially inner portion of the seal.

12. The apparatus according to claim 11 wherein the corner forms the only fulcrum between the seal groove inner peripheral surface and the side surface.

* * * * *